US008806618B2

(12) United States Patent
Livshits et al.

(10) Patent No.: US 8,806,618 B2
(45) Date of Patent: Aug. 12, 2014

(54) SECURITY BY CONSTRUCTION FOR DISTRIBUTED APPLICATIONS

(75) Inventors: Benjamin Livshits, Kirkland, WA (US); Henricus Johannes Maria Meijer, Mercer Island, WA (US); Brian Beckman, Newcastle, WA (US); Jeffrey Van Gogh, Redmond, WA (US); Danny Van Velzen, Kirkland, WA (US); Dragos A. Manolescu, Redmond, WA (US); Bryan Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1173 days.

(21) Appl. No.: 12/059,930

(22) Filed: Mar. 31, 2008

(65) Prior Publication Data
US 2009/0249489 A1 Oct. 1, 2009

(51) Int. Cl.
*G06F 21/00* (2013.01)
(52) U.S. Cl.
USPC .............................................. 726/22; 726/26
(58) Field of Classification Search
USPC ...................................................... 726/22, 26
See application file for complete search history.

(56) References Cited

U.S. PATENT DOCUMENTS

| 4,408,203 | A * | 10/1983 | Campbell | 705/71 |
| 6,405,316 | B1 * | 6/2002 | Krishnan et al. | 713/190 |
| 2002/0004908 | A1 * | 1/2002 | Galea | 713/200 |
| 2003/0172159 | A1 * | 9/2003 | Schuba et al. | 709/225 |
| 2004/0260754 | A1 | 12/2004 | Olson et al. | |
| 2005/0246717 | A1 * | 11/2005 | Poole et al. | 719/316 |
| 2006/0271843 | A1 * | 11/2006 | Yarde et al. | 715/513 |
| 2006/0282897 | A1 | 12/2006 | Sima et al. | |
| 2007/0074169 | A1 | 3/2007 | Chess et al. | |
| 2007/0107057 | A1 | 5/2007 | Chander et al. | |
| 2007/0113282 | A1 | 5/2007 | Ross | |
| 2007/0189535 | A1 * | 8/2007 | Lee et al. | 380/255 |
| 2007/0251999 | A1 * | 11/2007 | Bohlke et al. | 235/380 |
| 2008/0091954 | A1 * | 4/2008 | Morris et al. | 713/187 |
| 2008/0120420 | A1 * | 5/2008 | Sima et al. | 709/229 |
| 2009/0006861 | A1 * | 1/2009 | Bemmel | 713/189 |
| 2009/0019525 | A1 * | 1/2009 | Yu et al. | 726/3 |

FOREIGN PATENT DOCUMENTS

EP 1420562 A2 5/2004

OTHER PUBLICATIONS

Livshits et al., Using Web Application Construction Frameworks to Protect Against Code Injection, ACM San Diego, California, Jun. 14, 2007.
Vogt et al., Cross-Site Scripting Prevention with Dynamic Data Tainting and Static Analysis, University of California, Santa Barbara California, Accessed Feb. 11, 2008.
Jovanovic et al., Preventing Cross Site Request Forgery Attacks, Technical University of Vienna, Accessed Feb. 11, 2008.

(Continued)

*Primary Examiner* — Lisa Lewis
(74) *Attorney, Agent, or Firm* — Dan Choi; Brian Haslam; Micky Minhas

(57) ABSTRACT

Secure distributed applications are produced by default upon construction. Mechanisms are provided to address distributed application vulnerabilities (e.g., cross-site scripting, cross-site request forgery, replay attacks. . . ) automatically. These mechanisms are provided in conjunction with a tier split component that breaks up an application for execution across multiple contexts or tiers. As a result, any application that is tier split is protected from security vulnerabilities by default without any intervention on the part of a developer.

20 Claims, 17 Drawing Sheets

(56) References Cited

OTHER PUBLICATIONS

Livshits et al., Towards Security by Construction for Web. 2.0 Applications, Microsoft Research, Accessed Feb. 11, 2008.

Yang et al, A Unified Platform for Data Driven Web Applications with Automatic Client-Server Partitioning, In Proceedings of the International Conference on World Wide Web, pp. 341-350, May 2007.

Nguyen-Tuong et al., Automatically Hardening Web Applications Using Precise Tainting, In Proceedings of the IFIP International Information Security Conference, Jun. 2005.

Jim et al., Beep: Browser-Enforced Embedded Policies, Technical report, Department of Computer Science, University of Maryland, 2006.

Miller et al., Caja: Safe Active Content in Sanitized JavaScript, http://google-caja.googlecode.com/files/caja-2007.pdf, Dec. 31, 2007.

Jim et al., Defeating Script Injection Attacks with Browser-Enforced Embedded Policies, In Proceedings of the International World Wide Web Conference, pp. 601-610, May 2007.

Pietrazek et al., Defending Against Injection Attacks through Context-Sensitive String Evaluation, In Proceedings of the Recent Advances in Intrusion Detection, Sep. 2005.

Haldar et al., Dynamic Taint Propagation for Java, In Proceedings of the 21st Annual Computer Security Applications Conference, pp. 303-311, Dec. 2005.

Erlingsson et al., End-To-End Web Application Security, In Workshop on Hot Topics in Operating Systems, May 2007.

Livshits et al., Finding Security Vulnerabilities in Java Applications with Static Analysis, In Proceedings of the USENIX Security Symposium, pp. 271-286, Aug. 2005.

Google Corporation, Google Web toolkit, http://code.google.com/webtoolkit.

Yu et al., JavaScript Instrumentation for Browser Security, In Proceedings of Conference on Principles of Programming Languages, Jan. 2007.

Cooper et al., Links: Web Programming Without Tiers, In Formal Methods for Components and Objects (FMCO), Nov. 2006.

Crockford, AdSafe: Making JavaScript Safe for Advertising. http://www.adsafe.org, 2007.

Close, Web-key: Mashing with permission, http://waterken.sourceforge.net/web-key/, 2008.

Howell et al, MashupOS: Operating System Abstractions for Client Mashups, In Proceedings of the Workshop on Hot Topics in Operating Systems, May 2007.

Microsoft Live Labs, Microsoft Volta, http://labs.live.com/volta/, 2007.

Kirda et al., Noxes: A Client-Side Solution for Mitigating Cross-Site Scripting Attacks, In Proceedings of the Symposium on Applied Computing, Apr. 2006.

Jovanovic et al., Pixy: A Static Analysis Tool for Detecting Web Application Vulnerabilities, In Proceedings of the Symposium on Security and Privacy, May 2006.

Chong et al., Secure Web Applications via Automatic Partitioning, In Proceedings of the Symposium on Operating Systems Principles, Oct. 2007.

Livshits et al., SecuriFly: Runtime Protection and Recovery from Web Application Vulnerabilities, Technical report, Stanford University, Oct. 2006.

Huang et al., Securing Web Application Code by Static Analysis and Runtime Protection, In Proceedings of the Conference on World Wide Web, pp. 40-52, May 2004.

Chong et al., SIF: Enforcing Confidentiality and Integrity in Web Applications, In Proceedings of the USENIX Security Symposium, pp. 1-16, Aug. 2007.

Xie et al., Static Detection of Security Vulnerabilities in Scripting Languages, In Proceedings of the USENIX Security Symposium, pp. 271-286, Aug. 2006.

Jackson et al., Subspace: Secure Cross-Domain Communication for Web Mashups, In Proceedings of the World Wide Web Conference, May 2007.

Samy, The Samy worm, http://namb.la/popular/, Oct. 2005.

Fogie et al., Cross Site Scripting Attacks: XSS Exploits and Defense, 2007, pp. 1-482, Syngress Publishing, Massachusetts, USA.

RSnake, XSS Cheat Sheet Esp: for filter evasion, Jan. 3, 2006. http://ha.ckers.org/xss.html.

* cited by examiner

SECURITY BY CONSTRUCTION FOR DISTRIBUTED APPLICATIONS

BACKGROUND

In recent years, the battle for software security has largely moved into the area of web applications with vulnerabilities such as cross-site scripting and SQL injection dominating mailing lists and bulletin boards once populated by buffer overruns and format string attacks. Web applications present an attractive attack target because of their wide attack surface and the potential to gain access to sensitive information such as credentials and credit card numbers, or to perform unauthorized actions on the part of innocent users, which is routinely accomplished with cross-site scripting (XSS) and cross-site request forgery (XSRF) attacks.

While security experts routinely bemoan the current state of the art in software security, from the standpoint of the application developer, application security requirements present yet another hurdle to overcome. Given pressure for extra functionality, other concerns such as performance and security often do not receive the time they deserve. While it is common to blame this on developer education, a big part of the problem is that it is extremely easy to write unsecure code.

By way of illustration, consider an application that prompts a user for her name and sends a greeting back through the browser. The following example illustrates how one can accomplish this task in a Java/J2EE application:

```
ServletResponseStream out = resp.getOutputStream( );
out.println("<p>Hello, " + username + ".</p>");
```

However, the apparent simplicity of this example is deceptive. Assuming string "username" is supplied as application input, this piece of code is vulnerable to a cross-site scripting attack. Since JavaScript can be embedded into "username," when the request is processed within the web application, this script will be passed to the client's browser for execution, enabling a variety of malicious activity.

In effect, the most natural way to achieve the task of printing the user's name is unsafe. To make this secure, the developer has to apply input sanitization, which is often a tedious and error prone task. Further, after the issue of data sanitization has been dealt with, the developer still needs to consider all the ways in which tainted input can propagate through the application and make sure it is sanitized on all paths.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to distributed application security. More specifically, mechanisms are provided to afford default security by construction. Rather than requiring user involvement to address web application vulnerabilities such as cross-site scripting and cross-site request forgery, such security vulnerabilities are prevented automatically. In accordance with an aspect of the disclosure, a development system includes a security component coupled with a tier split component to analyze and inject and/or transform tier split code to address security issues. As a result, secure code is generated by default upon employment of the subject system.

Various techniques are provided for securing distributed application within a development framework, for instance. In accordance with one aspect, a capability can be provided by a server to a client and exchanged with requests by the client to enable authorized interaction while preventing unauthorized access. According to another aspect, a request stream can be monitored and a capability revoked and/or access blocked upon detection of inappropriate action. In accordance with another aspect, client/server interactions can be encrypted to prevent interception and snooping, among other things. According to still another aspect, application data can be sanitized to ensure code is not injected unintentionally. In accordance with yet another aspect, techniques are disclosed to enable mashups or application combinations without compromising an otherwise secure application.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
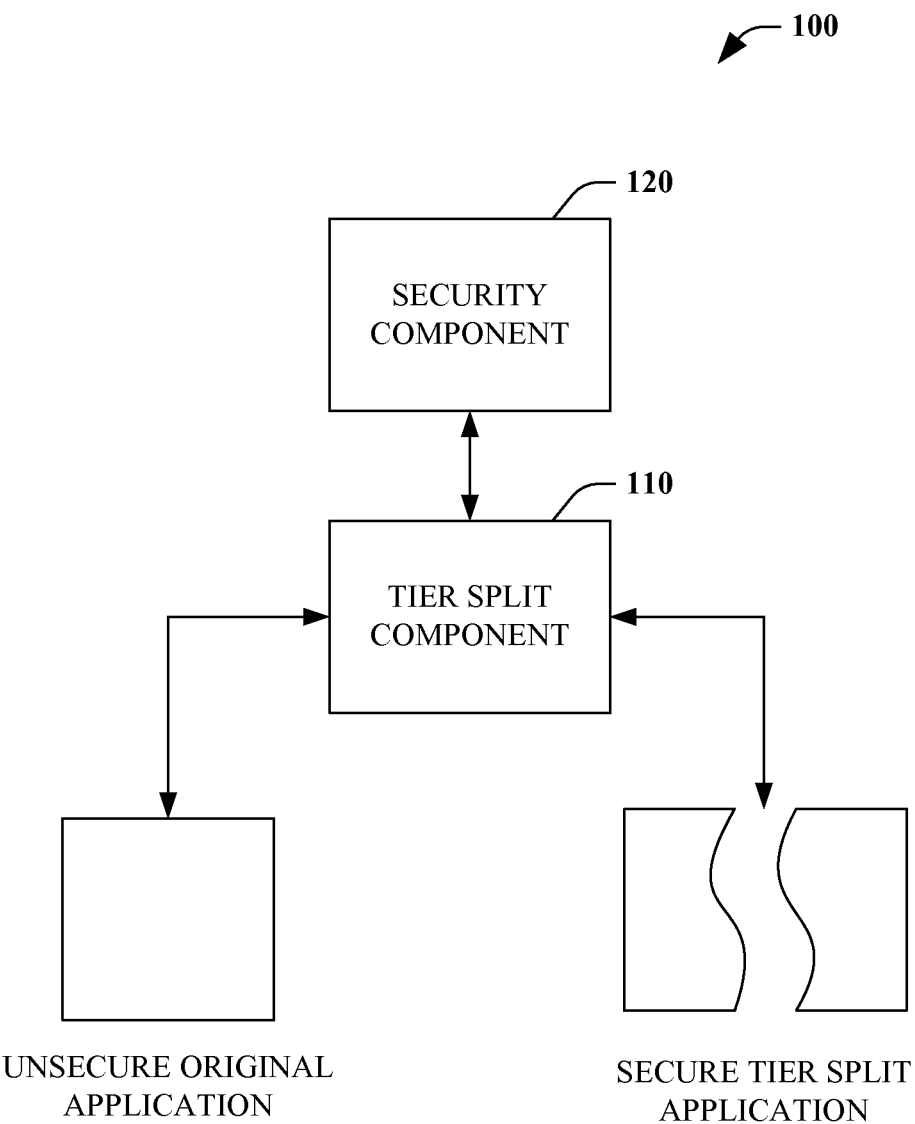
FIG. 1 is a block diagram of secure application development system in accordance with an aspect of the subject disclosure.

Systems and methods pertaining to automatic security of distributed application upon construction are described in detail hereinafter. Conventionally, absent developer involvement, distributed applications are insecure by default. Now, the situation is reversed such that applications are secure by default upon construction. More particularly, common vulnerabilities associated with web applications including cross-site scripting and cross-site request forgery are prevented without developer intervention at an application runtime and/or development framework level. In one implementation, this can be accomplished in conjunction with a distribution compiler or like component, which generates distributed applications. A brief overview of common vulnerabilities afflicting web applications is first provided followed by a description of mechanisms to prevent them automatically in accordance with an aspect of the claimed subject matter.

By far the most common type of attack on web applications is cross-site scripting (XSS). XSS is a security vulnerability involving malicious code injection in the form of a browser script. The vulnerability exists as a result of a number of factors including the mixture of data and code supported by HTML (HyperText Markup Language), an inability of web browsers to distinguish between trusted and un-trusted code, as well as insufficient data validation and/or encoding by developers. The root problem is that data can be interpreted as code. Accordingly, most attacks involve attempts to pass code off as data. If an XSS attack is successful, an injected piece of script can perform just about any action including information theft, account hijacking, presentation modification, and malware installation.

XSS attacks generally fall into one of three categories: XSS-0 (client-side), XSS-1 (reflected), and XSS-2 (persistent). XSS-0 is a bit of a misnomer because it does not involve the server at all but rather script injection occurs entirely on a client side. For example, an assignment "div.innerHtml=userComment" can cause a form of XSS if the value of "userComment" is obtained from unsanitized user-provided input that contains embedded script. XSS-1 is probably the most common category of cross-site scripting that involves input being reflected by the server back to the client verbatim in the output, thus creating an easy vector for script injection. This enables an attacker to execute script with user privileges at the site being attacked, allowing for theft of cookies associated with the site, among other things. XSS-1 is typically initiated by a phishing email to the client. XSS-2 is a variation on XSS-1, where input is stored on the server and then included in the output at a later point. A typical example is embedding malicious code within a blog posting. XSS-2 may lead to large-scale outbreaks such as JavaScript worms.

Cross-site request forgery (XSRF) is related but slightly different from XSS. Rather than requiring script injection, XSRF entails employing user credentials for a particular web application in a malicious way. An attack typically involves tricking a user into loading a page or executing a script that executes a request on the user's behalf with the user's credentials. For example, an attacker could provide a page that upon viewing obtains a user's credentials from a cookie and performs actions on a user's behalf.

Distributed applications are also vulnerable to replay attacks. This vulnerability is similar to XSRF but without the scripting aspect. In this situation, a valid data transmission is intercepted and fraudulently repeated. The receiving server is tricked into executing unauthorized operations by using a duplicate transaction. For example, a user's login credentials can be captured and resent later or a bank transaction transferring money out of an account can be intercepted and replayed.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a secure application development system 100 is depicted in accordance with an aspect of the claimed subject matter. The system 100 includes tier split component 120 that facilitates splitting or otherwise partitioning an application in a variety of ways. Generally, the tier split component 110 can partition a single application for execution across multiple execution contexts, wherein the contexts can belong to different security realms. In one particular instance, the tier split component 110 can transform a single-tier application into a multi-tier application suitable for distributed deployment. This can be accomplished automatically; however, support for manual or semi-automatic operation is also possible.

It is to be noted that in one instance the single tier application can be a component of a distributed application that executes within a single execution context. Further yet, if the application does not have any inflows from external sources like a distributed application would have then it is relatively secure.

Moreover, it is to be appreciated that tier split component 110 splits an application in a manner that preserves program semantics. Accordingly, split application execution is semantically equivalent to sequential execution of the application on a single tier. In one embodiment, the tier split component 110 can correspond to a distributing compiler.

Unfortunately, tier splitting can introduce a considerably less secure application than the original because it introduces a data flow input (i.e., inflow) that did not exist prior to tier splitting. Indeed, consider an application including an identity function: "string id (string input) {return input}". If the application is distributed so that the function "id" is located on a server, this function becomes an entry point for potentially malicious input, thus creating a classic reflective XSS-1 vulnerability. This results because tier splitting an application creates an attack perimeter that was previously not there. Not only might this newly created vulnerability not be obvious to a developer, it is not even clear how to plug it since conventional sanitization approaches rely on knowing how to sanitize the input, which is far from clear from a function as general as "id".

Security component 120 addresses the attack perimeter problem as well as other security issues automatically without developer intervention. The security component 120 is communicatively coupled with the tier split component 120. Accordingly, the security component can influence tier-splitting operations to ensure production of safe code. For example, the security component 120 can inject, transform, and/or rewrite client and/or server-side code in a secure manner.

Figure 2:
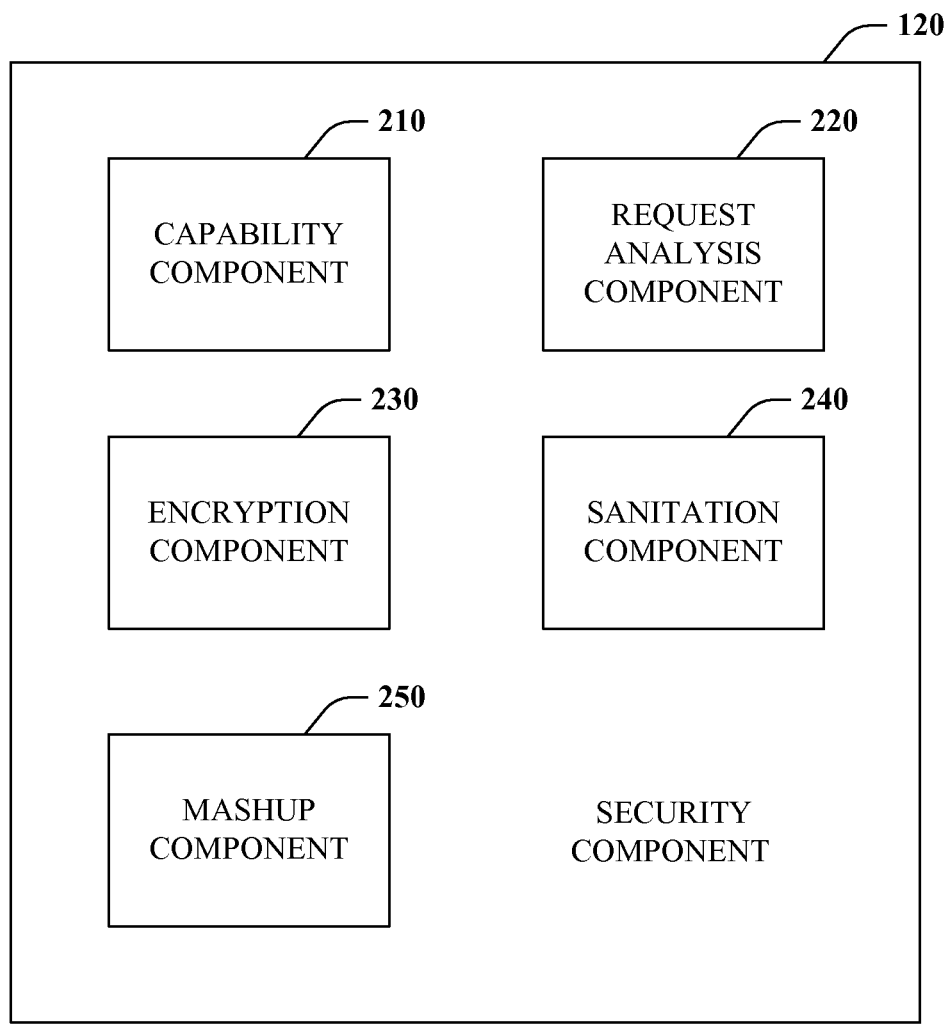
FIG. 2 is a block diagram of a representative security component according to a disclosed aspect.

Turning attention to FIG. 2, a representative security component 120 is illustrated in accordance with an aspect of the claimed subject matter. The security component 120 can include five sub-components, namely capability component 210, request analysis component 220, encryption component 230, sanitization component 240, and mashup component 250. The capability component 210 governs client-server interactions, by allowing a server to identify to a client its available capabilities with respect to the server. The capability can be returned to the client along with a request. The request analysis component 220 analyzes requests and can prompt revocation of client capability or otherwise block interaction upon identification of potentially malicious or unsecure actions, for example.

The encryption component 230 injects encryption/decryption logic or components into an application to secure distributed application communication across a network. For example, the encryption component 230 can provide one or more mechanisms to encrypt client-side application requests or commands and decrypt the requests on the server side. Similarly, the encryption component 220 can provide the same or similar mechanisms to encrypt server-side responses and decrypt those responses on the client side. In one embodiment, hypertext transfer protocol can performed over a secure socket layer (HTTPS). This provides a layer of protection against data interception or snooping, among other things.

The sanitization component 240 sanitizes presentation code such as HTML (HyperText Markup Language) to prevent code injection and ensure the code is well formed. Typically, this can be accomplished by analyzing and sanitizing any data received from the outside. However, this turns out to be a pretty challenging task because locating all the places data can be received is a difficult problem in practice. To circumvent this problem, sanitization can be performed on display output. However, the claimed subject matter can encompass user input and/or display output sanitization, amongst others. For example, the sanitization can also occur in the middle since a presentation layer can include a safe sanitizing abstraction layer on top that sits between code and the presentation layer. In this case, the sanitization component 240 need only validate the sanitization abstraction layer and not the presentation directly. Further yet, sanitization can be performed not only on presentation could but also dynamic code coming from different sources (e.g., jscripts, eval function, CSS (Cascading Style Sheets . . . )).

The mashup component 250 provides mechanism to prevent security vulnerabilities when mashing or combining foreign code with an otherwise secure distributed application. As will be described further infra, this can be accomplished by limiting applications that can be combined and/or rewriting or removing features that pose a security threat.

Figure 3:
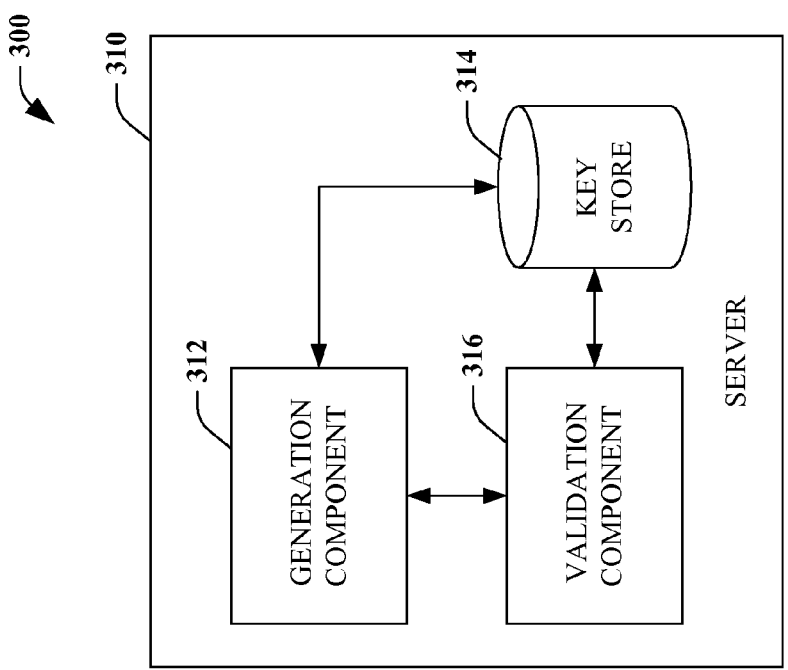
FIG. 3 is a block diagram of a client/server system that employs capabilities to govern transactions in accordance with an aspect of the disclosure.
Figure 3:
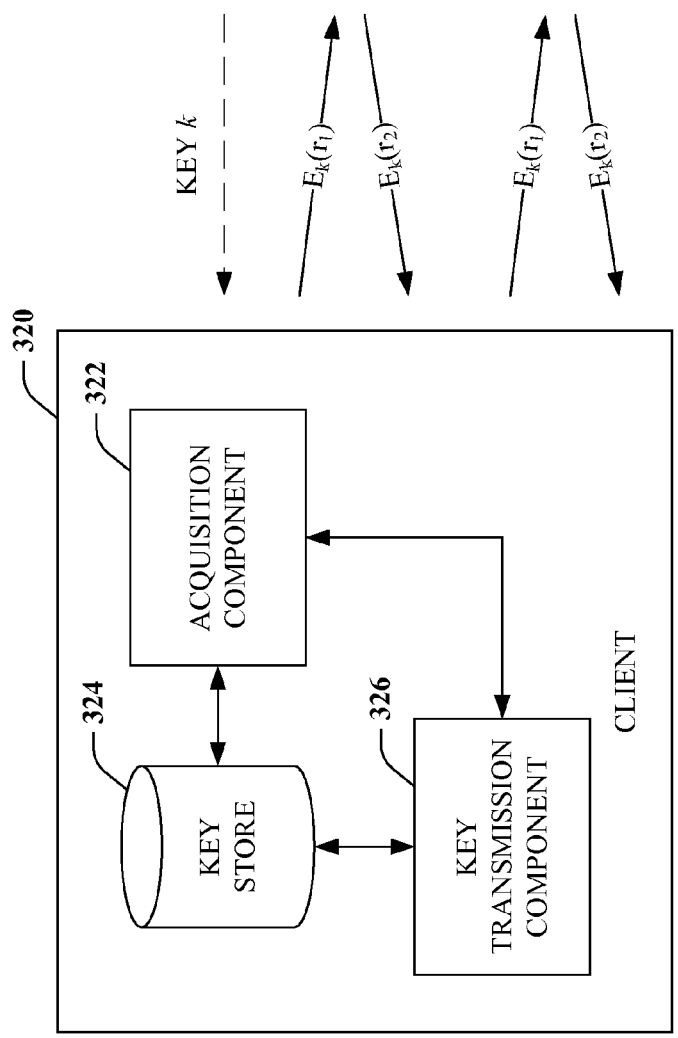

FIG. 3 illustrates a representative client/server system 300 that employs capabilities to govern transactions in accordance with an aspect of the claimed subject matter. As previously described, some security vulnerabilities can be addressed by granting capabilities to clients identifying operations that a server is expecting or is willing to accept from a client. Client communications without appropriate capabilities or permissions can be dropped or otherwise ignored. In accordance with one aspect of the claimed subject matter, capabilities can be linked to keys, nonces, or other unique identifiers that are generated on the server tier.

As shown the server or server side application 310 can include or be associated with a generation component 312, a key store 314, and a validation component 316. The generation component 312 generates or commissions generation of a unique identifier such as a key. This can involve utilization of one or more global user identifiers, timestamps or the like. In any event, the generation component 312 is able to produce a cryptographically strong key for provisioning to a client. Upon generation, the key and associated information (e.g., client identity) is stored at least temporarily in key store component 314. The key store 314 can correspond to volatile or nonvolatile memory or a persistent storage technology, among other things. The validation component 316 is a mechanism for validating client requests, commands or the like based on a provided key. In essence, the validation component 316 can identify a transmitted key and attempt to match it with the key the server 310 was expecting. If the keys match, the request can be processed. Otherwise, the request is blocked, ignored, or simply dropped.

Client or client-side application 320 includes an acquisition component 322, key store 326, and key transmission component 326 to facilitate capability based interaction. The acquisition component 322 receives, retrieves, or otherwise acquires a key from the server 310. The acquired key can be housed in key store 324 at least temporarily. Similar to key store 314, store 324 can correspond to volatile or nonvolatile memory or some persistent storage mechanism. Key transmission component 326 retrieves a corresponding key and ensures that it is transmitted with a requested to grant permission for request processing.

In accordance with one aspect of the disclosure, a key can be provided by the server 310 to the client 320 for an application session. Furthermore, the key can be transmitted back to the server as a cookie. For example, the server can volunteer a key for a session to the client 320. The client can then store that key as a browser cookie. Each request, command or like sent to the server 310 from the client will also include the browser cookie. Prior to processing, the server 310 will validate the key in the cookie by attempting to match it with that which was expected. If there is a match, processing continues. Alternatively, the request is not processed or rejected by the server 310. This protects against reflected cross-site scripting XSS-1 because attacker messages will be dropped since they do not include, or are not encoded with, the correct key.

According to another aspect of the disclosure, a key can be generated with each request to enforce a sequence of operations. An initial key can be provided by the server 310 to the client 320 for use in a first request, command, message, or the like. Upon processing of the request, the server 310 can generate a new key and transmit it back to the client with a request response, for instance. A subsequent request will need to transmit the new key together with the request for processing. In this manner, the server 310 is sending back a capability that encodes the next possible actions a server is willing to take in response to sending that capability. Among other things, this can prevent replay attacks and user errors. For example, suppose a user opens a browser window to book a flight and then clones that window. Further, suppose that the user books a flight in the cloned window. Now, the state in the original window and the cloned window are different, where the original window state is incorrect. If a user then believes the booking did not go through and subsequently books a flight in the original window, they will have booked two flights unintentionally. By using new keys after transactions, the second booking would be disallowed because it did not have a valid capability or permission to perform that action the second time.

In accordance with yet another aspect of the disclosure, more than one copy of the key can be provided by the client 320 to the server 310 to enable processing. For instance, the cookie including the key can be sent together with a request that injects a copy of the key into the client-side state. If one were simply interested in cross-site scripting and replay attacks, duplication may not be necessary. However, if one also desires to prevent cross-site request forgery, an addition copy should be transmitted. Sending a cookie alone with the request may not be sufficient in light of XSRF, since that cookie can be automatically returned to the requesting server. Accordingly, the key value should be stored on the client and be duplicated as part of the request. By way of example, if the request is an HTTP Get request, then the key can be part of the URL. If it is an HTTP Post request, then it can be part of the post. Other requests may need to be modified to include the key. For instance, if the request involves submitting of an HTML form, a hidden field can be added which includes the key. In the case of an AJAX (Asynchronous JavaScript and XML) request, a global variable on the client can include the key, and the key will be made part of each AJAX request transmitted to the server. Upon arrival of the request, the validation component 316 can first check to see if the keys match. If they do not, the request can be denied and no processing performed. If the keys match, then the validation component 316 can check to ensure the matching keys are correct in light of what is expected prior to processing. Furthermore, it is to be noted that an encrypted key could also be required to initiate server process, because if it is not encrypted by the server it could be forged by a malicious client. If the server encrypts the key without handing out the encryption key, the data is guaranteed to be from the original server.

Figure 4:
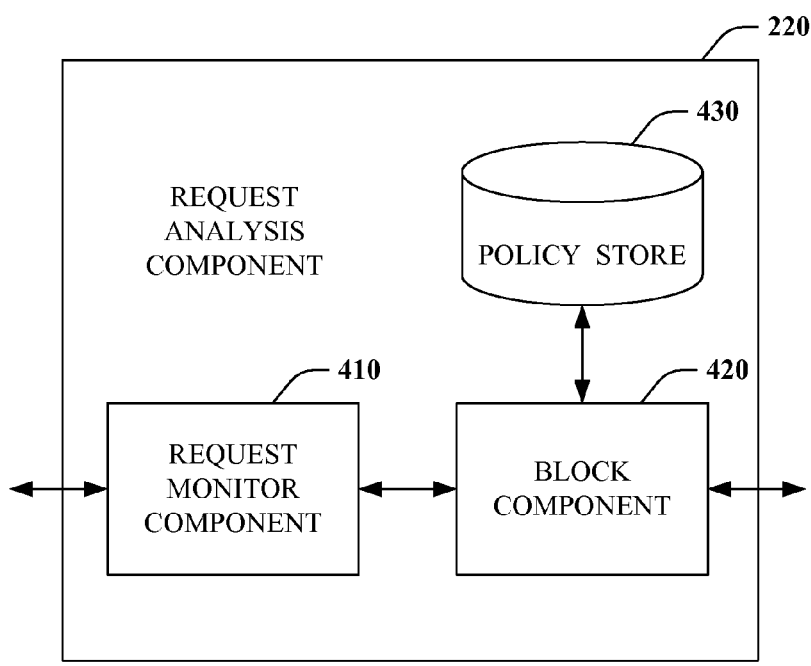
FIG. 4 is a block diagram of a representative request analysis component according to an aspect of the disclosure.

Referring to FIG. 4, a representative request analysis component 220 is depicted in accordance with an aspect of the claimed subject matter. The request analysis component 220 includes a request monitor component 410 that receives, retrieves, or monitors server side requests. Block component 420 can analyze one or more requests in light of various policies or signatures in store 430. The policy store 430 provides a collection of policies and/or signatures that identify known or potential attack characteristics or general policies to prevent attack. Upon determining or inferring that a request or group of requests satisfies a policy or signature, the block component 420 can block processing thereof. In other words, client capability or permission can be revoked. By way of example, if a request arrives after a predetermined time, the capability can be removed. In another instance, where a request returns within a millisecond, for example, processing will be blocked since it is likely that this is an automated request. Overall, a stream of requests can be analyzed to determine if a request or pattern of requests corresponds to something believed to be malicious or a potential security issue. Capability can then be revoked by blocking specific requests or requests from particular Internet protocol (IP) addresses, among other things.

Figure 5:
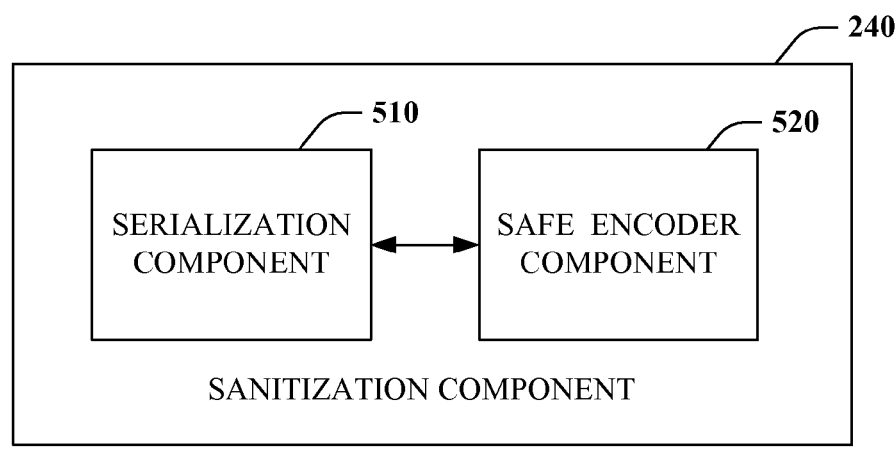
FIG. 5 is a block diagram of a representative sanitization component in accordance with a disclosed aspect.

A representative sanitization component 240 is depicted in FIG. 5 in accordance with an aspect of the claimed subject matter. The sanitization component 240 includes a serialization component 510 communicatively coupled with a safe encoder component 520. The serialization component 510 is a mechanism for serializing and deserializing data in the context of storage and transmission. The safe encoder component 520 applies one or more encodings to block unintended script injection as well as ensure well-formed presentation code (e.g., HTML, CSS, XAML), among other things. In accordance with one aspect of the claims, the safe encoding can be applied upon output to HTML, for example, rather than attempting the more difficult task of sanitizing all input. Further, sanitization functionality can be injected where needed in system libraries and or user specified code. In any event, automatic sanitization avoids the possibility of XSS-0, XSS-1, and XSS-2.

By way of example and not limitation, consider a blog or guestbook application that simply acquires data and provides it an executable context. If those comments include script, it can be executed when presented in a web page. However, by sanitizing the output it can be ensured that the data is presented as data and not interpreted as code.

In one implementation, escaping can be utilized to prevent code execution. For example, consider the following code snippet:

```
namespace Example.Html
{
    public class TextArea : HtmlElement
    {
        [Escape ("HTML")]
        public extern string Value;
        [Escape ("URL")]
        public extern string Background;
    }
}
```

This is a declaration for an HTML text area control. As shown, declarative annotation is employed for HTML and URL escaping. Here, "Value" is HTML encoded and "Background" is "URL" encoded. Of course, other encodings and escaping strategies are also possible. In this case, however, the encodings ensures that script will not be injected and that allowed background URLs are local to the server, for instance.

To further appreciated how HTML escaping can work consider the following exemplary code snippet:

```
// create two DIV elements
Div div1 = new Div( );
Div div2 = new Div( );
// add them to the page
page.AppendChild(div1);
page.AppendChild(div2);
// set their contents
div1.Value = "<script>alert('hi')</script>";
div2.Value = div1.Value + "abc";
```

In this case, two "Div" elements or containers for rending HTML are created, added to a web page, and values set. However, "div1.Value" includes script that generates a "hi" alert and "div2.Value" is a function of "div1.Value". Where HTML encoding is employed, both will be escaped. The result can be a quoted version where the first and second elements include literals "<script>alert('hi')</script>" and "<script>alert('hi')</script>abc", respectively. Accordingly, neither will cause script execution when serialized to HTML within an application's page.

Further, application programming interfaces (APIs) or one or more other components can return a safe writer. For instance, sometimes developers want to build HTML strings for performance so they write:

```
Stringbuilder s = new stringBuilder( )
s.append ("<div>")
s.append (b)
s.append ("</div>")
div3.innerHTML = s.toString( );
```

This poses the sanitation problem. Writing

```
var d = new Div( );
d.value = b;
div3.appendChild(d):
``` would make it secure but not as performant. One way to address this issue is to have a safe API to stream values:

```
Var writer = Div3.WriteInnerHtml( );
Writer.StartElement("div");
Writer.Value(b);
Writer.EndElement( );
Writer.Close( );
```

The latter API combines the performance benefits and sanitization possibilities. An author can write against this directly or a code transformation could transform the code can generate this.

Figure 6:
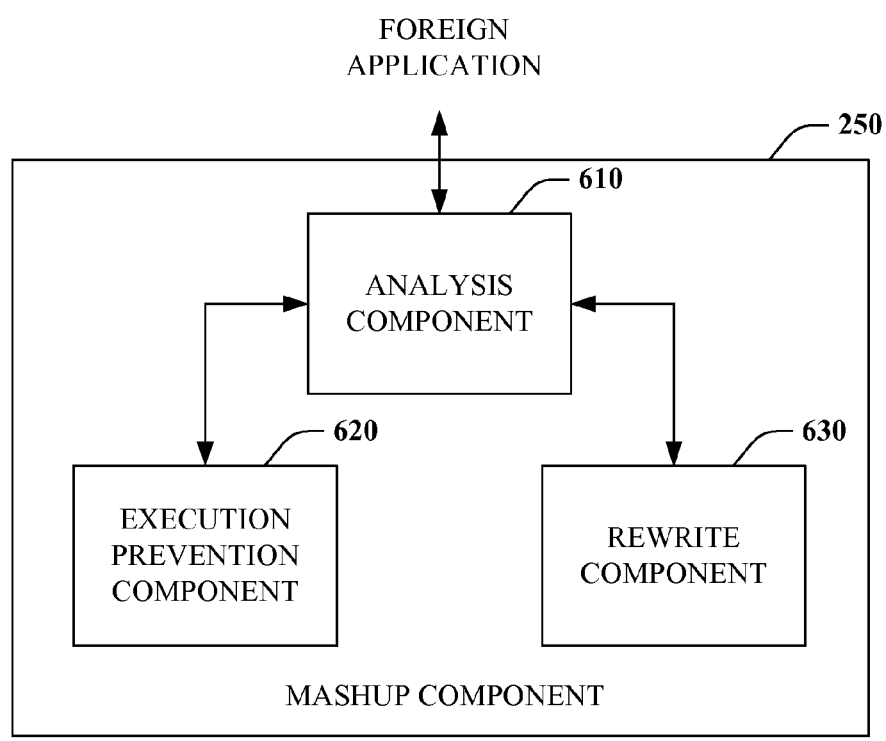
FIG. 6 is a block diagram of a representative mashup component according to an aspect of the subject disclosure.

Referring to FIG. 6, a representative mashup component 250 is illustrated in accordance with an aspect of the claimed subject matter. The mashup component seeks to prevent security issues caused by mashing or combining a foreign application with a secure distributed application, as described herein. One exemplary mashup could correspond to combining a mapping application with a secure statistics application to overlay statistics onto of a map. Unless precautions are taken, the foreign application could circumvent the security mechanisms employed by the secure application, for example by snooping to discover a capability or key representative thereof. Mashup component 250 can prevent such security breaches.

As shown, the mashup component 250 includes analysis component 610 and execution prevention component 620 and rewrite component 630. The mashup component 250 can operate in two different modes. The first mode corresponds to simply limiting the applications that can be combined with a secure application. In this instance, the analysis component 610 can determine the expressiveness of a foreign application and the execution prevention component 620 can block or prevent execution of the foreign application where the expressiveness exceeds a threshold. Applications of little expressiveness are not able to negatively impact security mechanisms in place for the secure applications and as such will be allowed to run. However, some highly expressive applications may be blocked. In practice, this policy might be too restrictive.

The second mode can be utilized where foreign applications are modified statically on the server or at runtime on the client to prevent actions that may threaten security. More specifically, the analysis component can analyze the foreign code and the rewrite component 630 can rewrite, transform, and/or filter out portions of the code determined or inferred to be a threat to security. In accordance with an aspect of the claims, rewriting can be performed upon deployment. In one instance, this can be done on the server side where the distributed application is hosted, for example through tunneling. Alternatively, rewriting can be done on the client side where the secure application is loaded first and is therefore in control of the page.

Both approaches are beneficial. The advantage of the second approach is that more applications are allowed to co-exist with a secure application while preserving the secure properties thereof. However, there is a runtime overhead because there is so much security checking. It should be appreciated that a hybrid approach is also contemplated where a higher expressiveness threshold is set and such applications are subject to filtering, transformation, and/or rewriting.

It is to be appreciated that while the foregoing security techniques are disclosed with respect to a development framework that provides automatic tier splitting, the claimed subject matter is not limited thereto. Other systems or frameworks can employ the techniques in a similar manner.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the security component 120 can employ such mechanisms in various manners to identify and/or extinguish security threats automatically.

In view of the exemplary systems described supra, methodologies that may be implemented in accordance with the disclosed subject matter will be better appreciated with reference to the flow charts of FIGS. 7-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
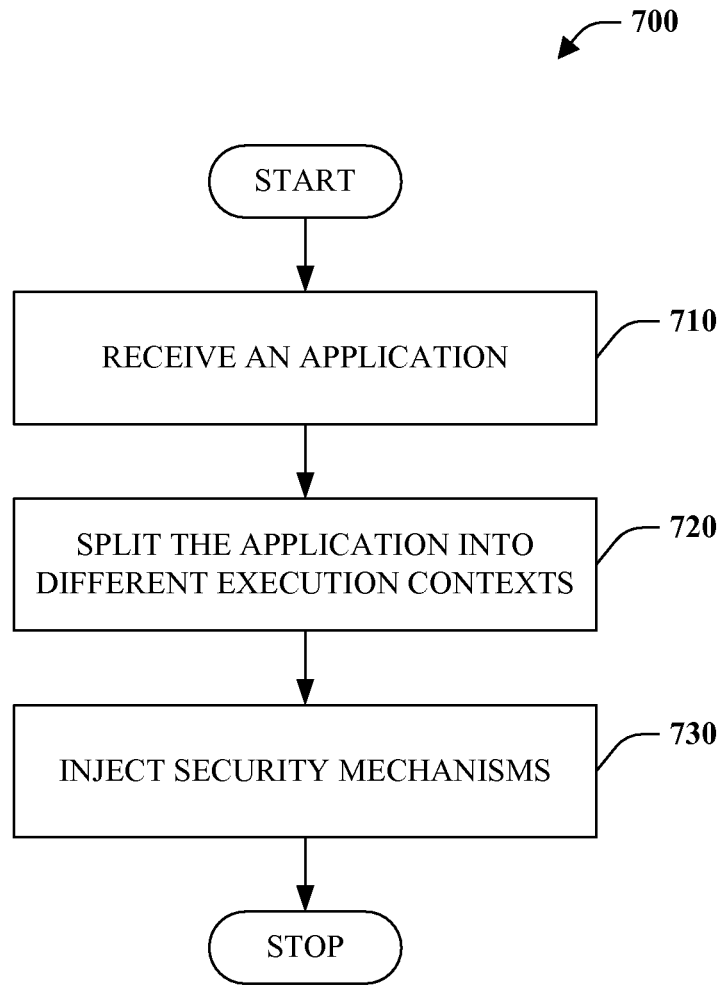
FIG. 7 is a flow chart diagram of a method of application construction according to a disclosed aspect.

Referring to FIG. 7, a method of application construction 700 is depicted in accordance with an aspect of the claimed subject matter. At reference numeral 710, an application is received. At numeral 720, the application is split into different execution contexts or tiers (e.g., client/server). At reference 730, security mechanisms are injected within the split applications automatically without developer intervention. The security mechanisms can seek to address common distributed application vulnerabilities including cross-site scripting, cross-site request forgery and replay attacks, among others. This can be accomplished by utilizing static and/or dynamic code analysis and subsequent transformation. Further, such security can be afforded by use of system code libraries or the like that include secure code.

Figure 8:
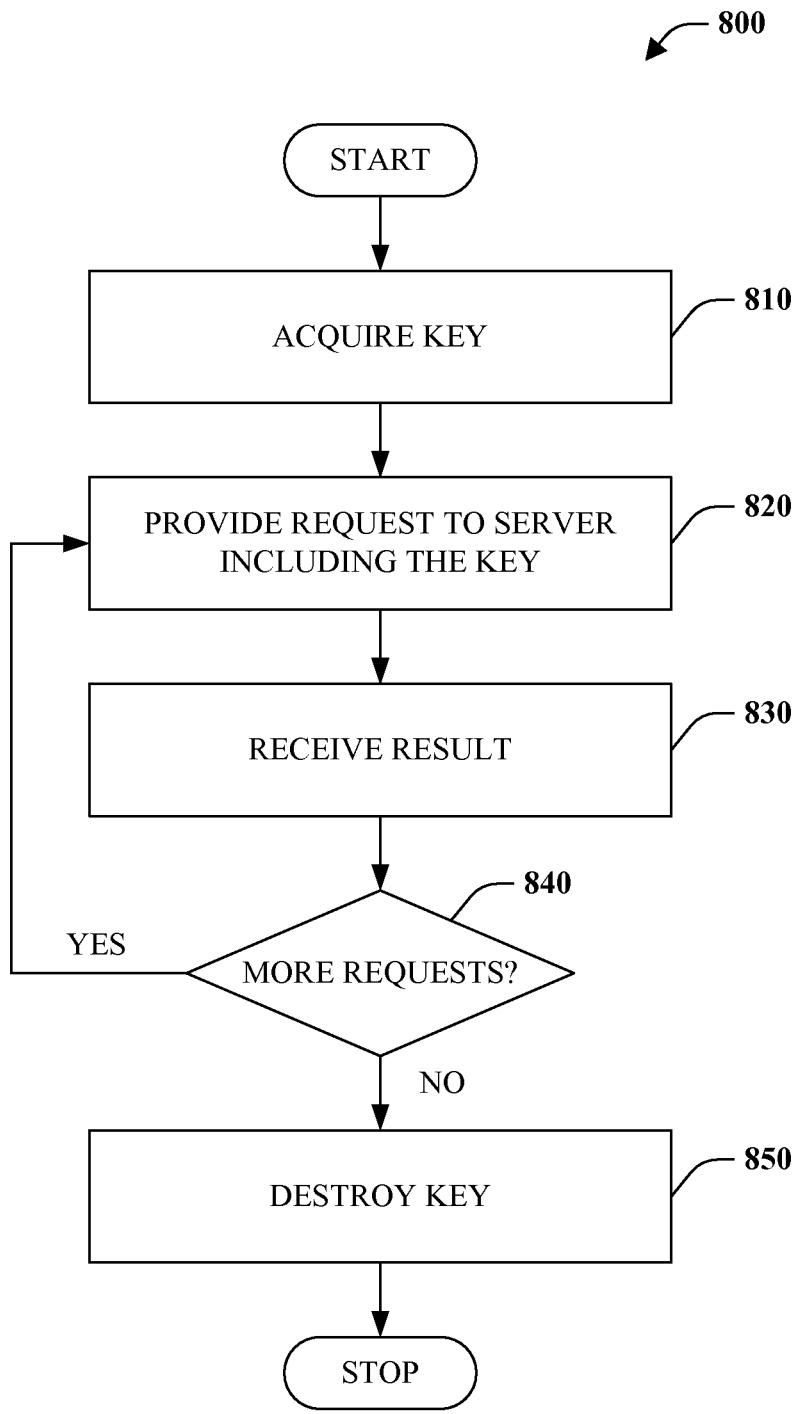
FIG. 8 is a flow chart diagram of a client-side client/server interaction method according to an aspect of the disclosure.

FIG. 8 illustrates a client-side client/server interaction method 800 according to an aspect of the claims. At reference numeral 810, a key is acquired from a server, for instance for a session. This key represents a capability granted by the server or server application to a client or client application. At numeral 820, a request is sent to the server along with the key. In one implementation, the key can be sent within a browser cookie. In another implementation seeking to address cross-site request forgery, one copy of the key is sent with a cookie and another copy injected or encoded as part of the request. At numeral 830, a result is received from the server. A determination is made at 840 as to whether the client side application seeks to send more requests. If yes, the method loops back to reference numeral 820 where a request is provided with a key to the server. Where the application is finished and no more requests need to be processed, the method continues at numeral 850 where the key is destroyed.

Figure 9:
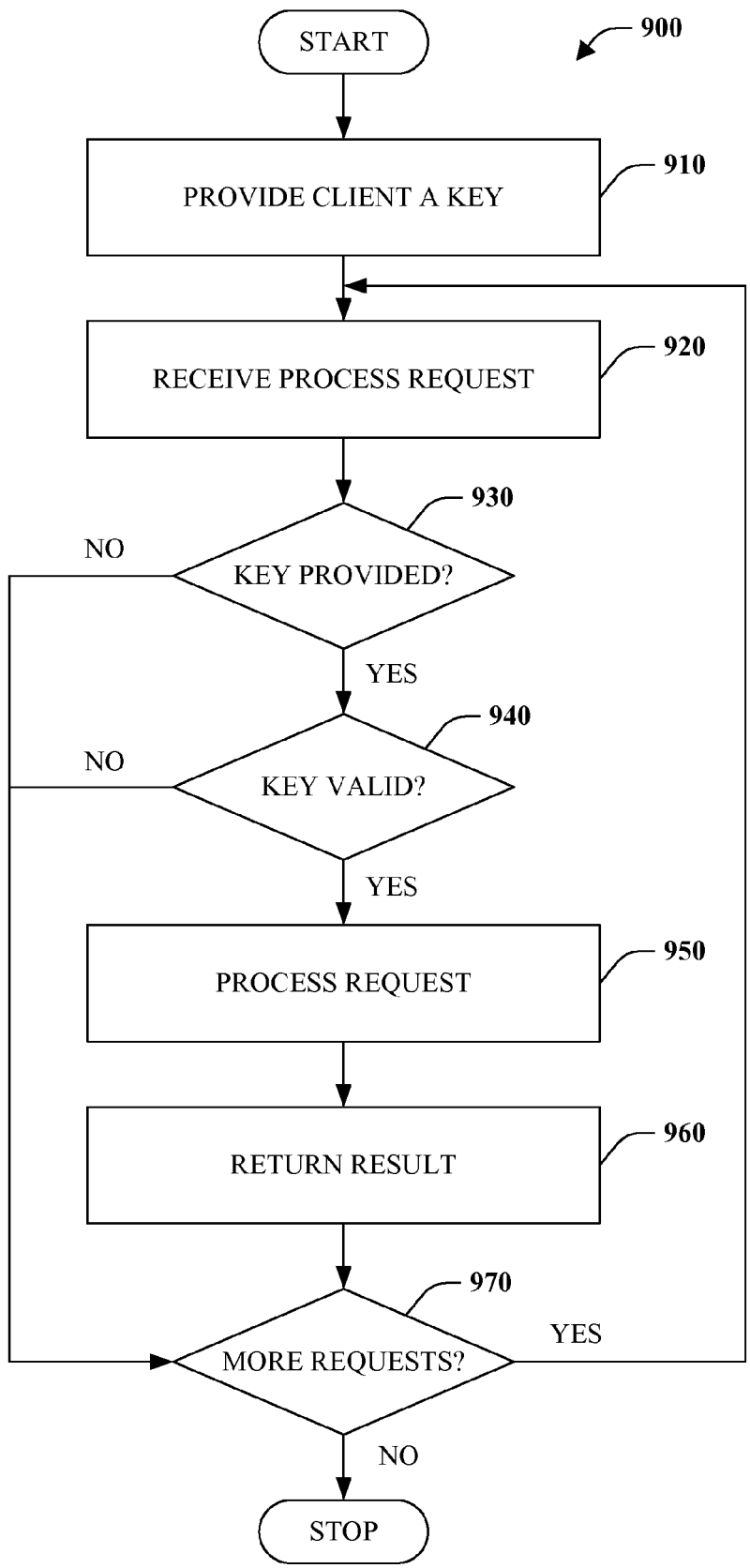
FIG. 9 is a flow chart diagram of a server-side client/server interaction method according to a disclosed aspect.

FIG. 9 is depicts a server-side client/server interaction method 900 in accordance with an aspect of the claims. At reference numeral 910, a client is provided with a key defining their capability with respect to server interaction. At numeral 920, a process request is received. A determination is made at 930 as to whether a key was provided with the request, perhaps as part of a cookie and/or the request itself. If a key was not provided, the request is not processed and the method continues at 970. If a key was provided at 930, the method continues at 940 where a check is made to determine if the key is valid. Such a check can seek to determine if the key supplied with the request matches the key provided to a client for such interaction. Furthermore, if two copies of keys are supplied in a cookie and as part of the request, for instance, the check can also determine whether the copies match. If the keys do not match, the request is not processed and the method continues at 970. Alternatively, the request is processed at 950 and results are returned at 960. At reference numeral 970, a determination is made as to whether more requests are to be processed. If yes, the method continues at 920 where a request is received. If no, the method simply terminates.

Figure 10:
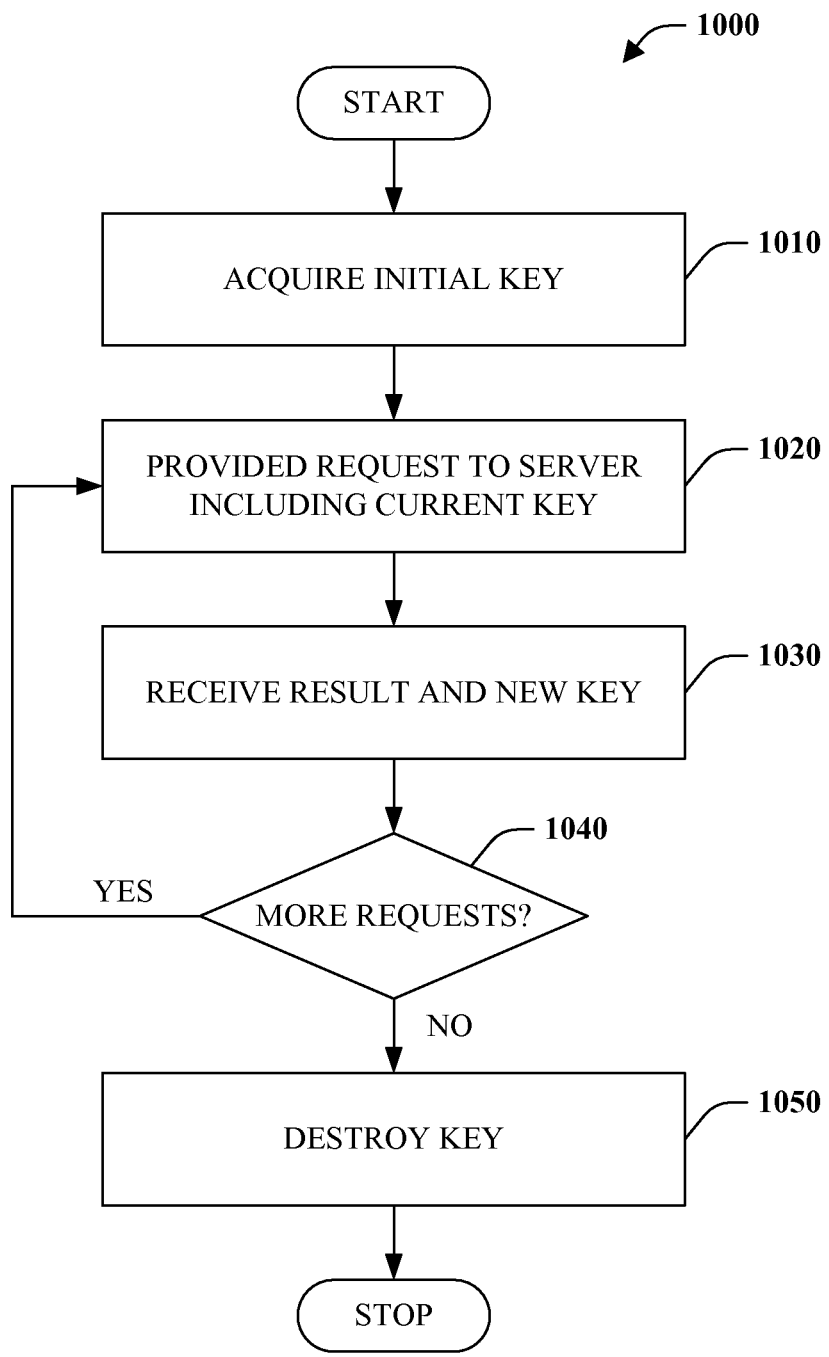
FIG. 10 is a flow chart diagram of a client-side client/server interaction method according to an aspect of the disclosure.

Referring to FIG. 10, a client-side client/server interaction method 1000 is depicted in accordance with an aspect of the claimed subject matter. In contrast to client-side method 800 of FIG. 8, it is to be noted that method 1000 enforces a sequence of actions. At reference numeral 1010, an initial key defining client capabilities with respect to a server portion of an application is acquired. At numeral 1020, a request is provided to the server including the current key. The key can be included as part of a cookie and/or the request itself. At numeral 1030, a result and/or a new key is received. Where the request requires a response such a result can be received. Alternatively, no result will be received. In any event, a new key is provided defining a new capability with respect to the server application. A determination is made at 1040 as to whether more requests are to be processed. If yes, the method continues at 1020 where a request is provided to the server including the current key. If no, the method proceeds at 1050 where the current key is destroyed.

Figure 11:
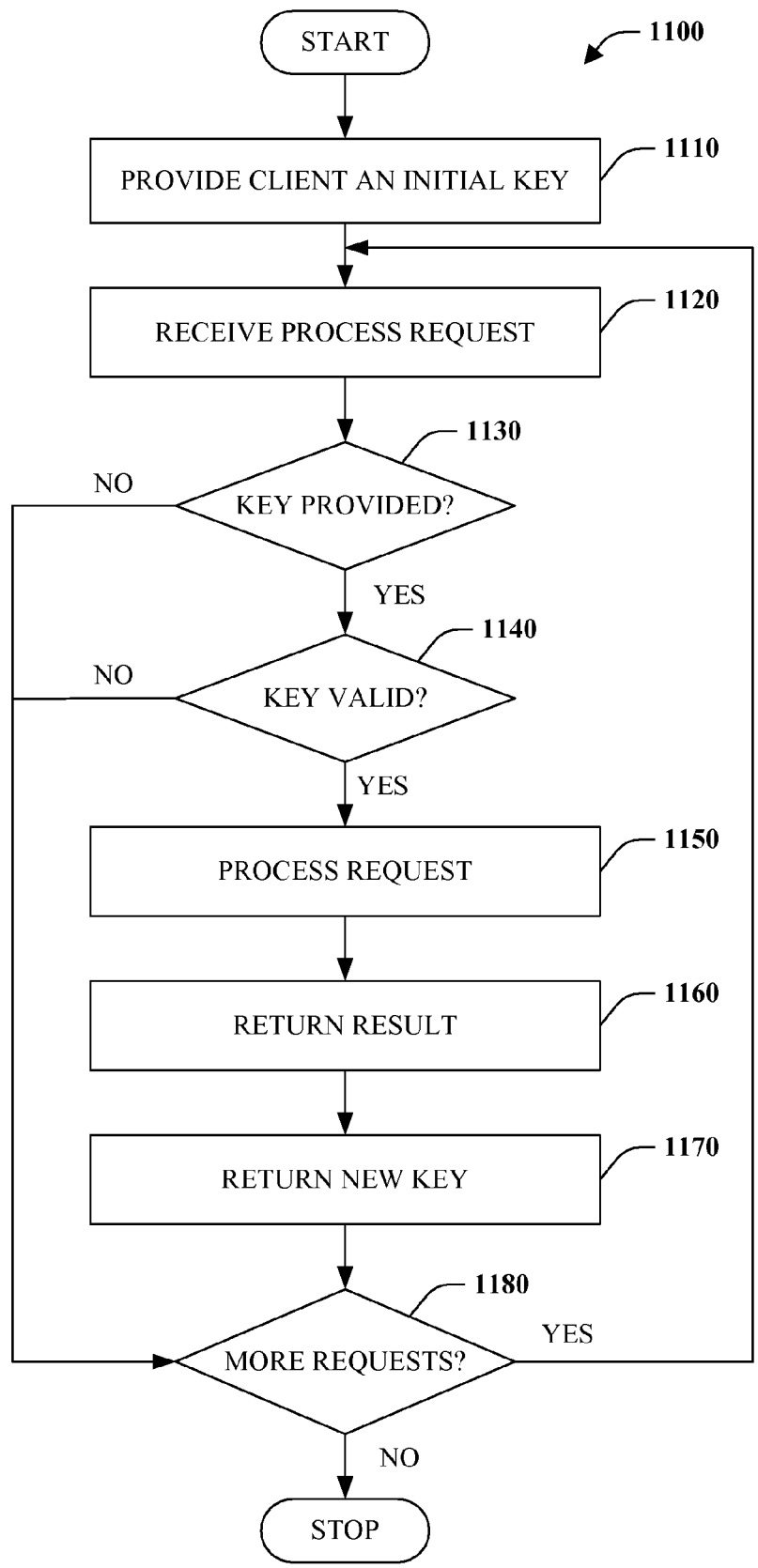
FIG. 11 is a flow chart diagram of a server-side client/server interaction method according to a disclosed aspect.

FIG. 11 illustrates a server-side client/server interaction method 1100 according to an aspect of the claimed subject matter. Note that the method 1100 enforces a sequence of operations in contrast to the method 900 of FIG. 9. At reference numeral 1110, an initial key is provided to a client defining a capability to interact with a server application. At numeral 1120, a process request or the like is received. A check is made to determine if a key was provided with the request at 1130. If no, the request is not processed and the method continues at 1180. If yes, a check is made at 1140 as to whether the key is valid. The check can correspond to comparing the received key with the provided key. If they keys do not match, the key is invalid, the request is not processed, and the method proceeds to numeral 1180. If they keys do match, the key is valid and the method continues to 1150. At numeral 1150, the request is processed and results are returned at 1160. Furthermore, at numeral 1170, a new key is generated and provided defining the new capabilities of the client. At numeral 1180, a determination is made as to method more requests are to be processed. If yes, the method continues at 1140. Alternatively, the method terminates.

Figure 12:
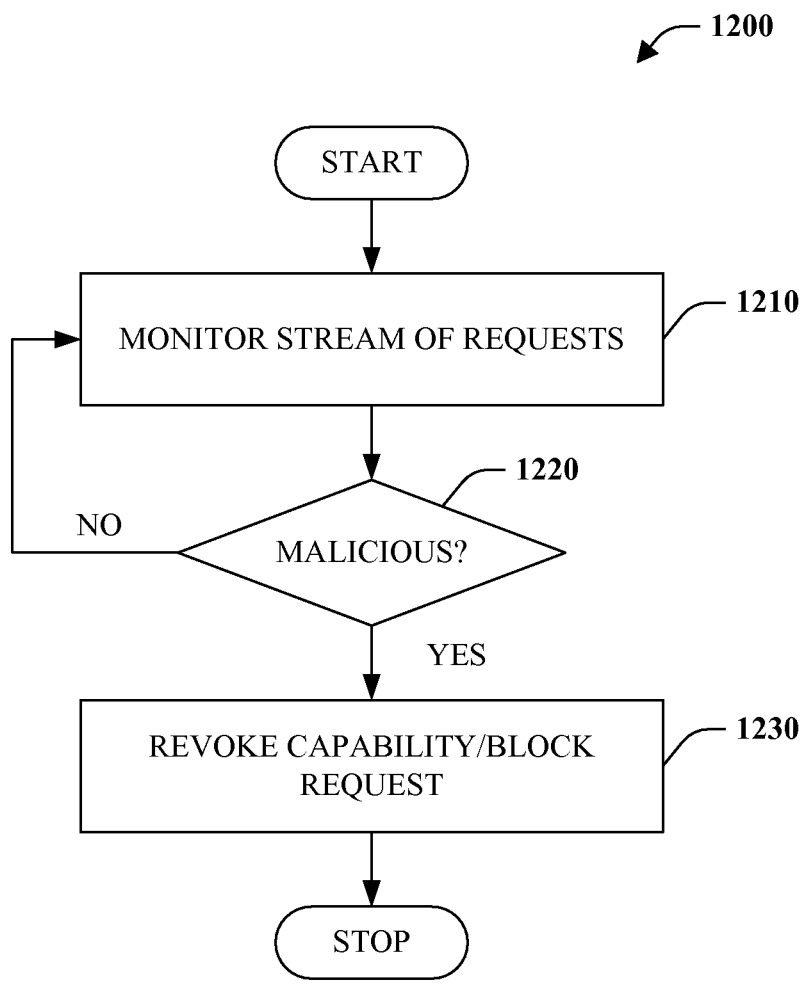
FIG. 12 is a flow chart diagram of a request analysis method according to an aspect of the disclosure.

FIG. 12 illustrates a method of request processing 1200 according to an aspect of the claims. At reference numeral 1210, a stream of requests is monitored. The stream of requests can correspond to client application requests or other communications with a server application. A check is made at numeral 1220 as to whether any malicious or potentially harmful actions has been determined or inferred, for instance based on a certain time frame. For example, malicious activity can be inferred if a request is received in a few milliseconds where a user was expected to fill in a large form, since this is indicative of an automated response. If no malicious activity is identified at 1220, the method can continue to monitor the stream of requests at 1210. Alternatively, a capability is revoked and/or a request or client is blocked at reference numeral 1230.

The method 1200 provides an additional mechanism to control interactions in addition to or as an alternative to key matching. By way of example, even where a key is valid, if it is presented after a time out period, the capability can be revoked. Additionally, if a series of requests from a client include incorrect keys, all requests from the client can be blocked, for instance by blocking an associated IP address.

Figure 13:
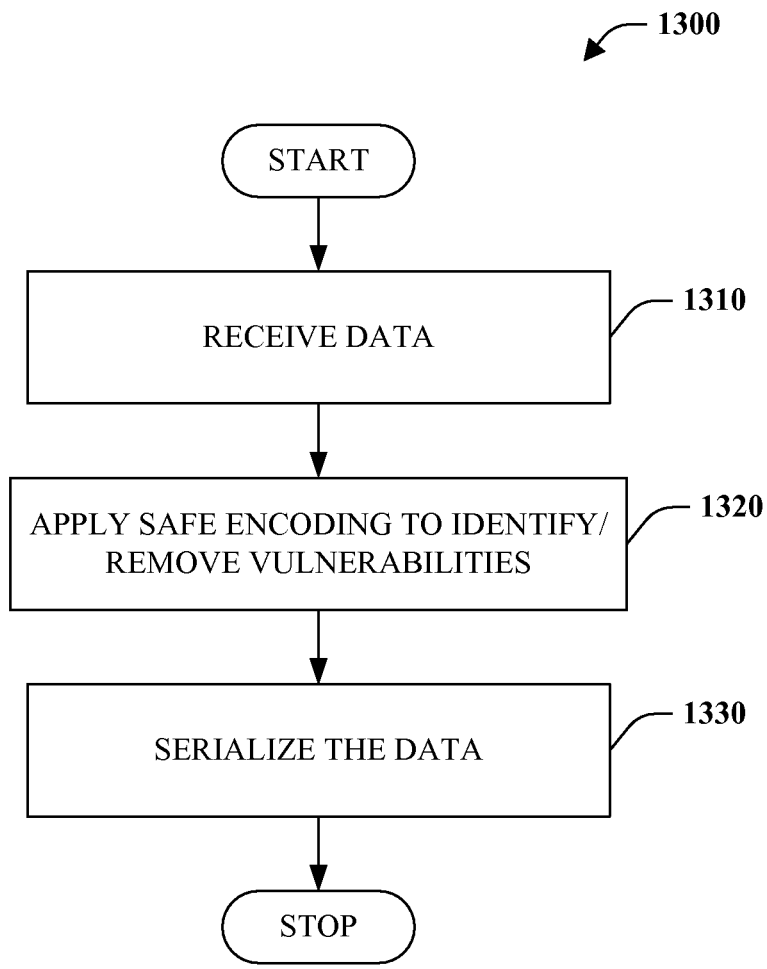
FIG. 13 is a flow chart diagram of a method of sanitizing data according to an aspect of the disclosed subject matter.

Turning attention to FIG. 13, a flow chart diagram of method data sanitization 1300 is depicted in accordance with an aspect of the claimed subject matter. At reference numeral 1310, data is received. Safe encoding is applied to the data at numeral 1320 to identify and remove vulnerabilities. For example, HTML can be escaped to avoid injection of script and ensure the HTML is well formed (e.g., begin and end tags match). Other techniques can also be applied, for example to ensure URL references are local. At numeral 1330, the code is serialized or deserialized, perhaps to an output web page.

Figure 14:
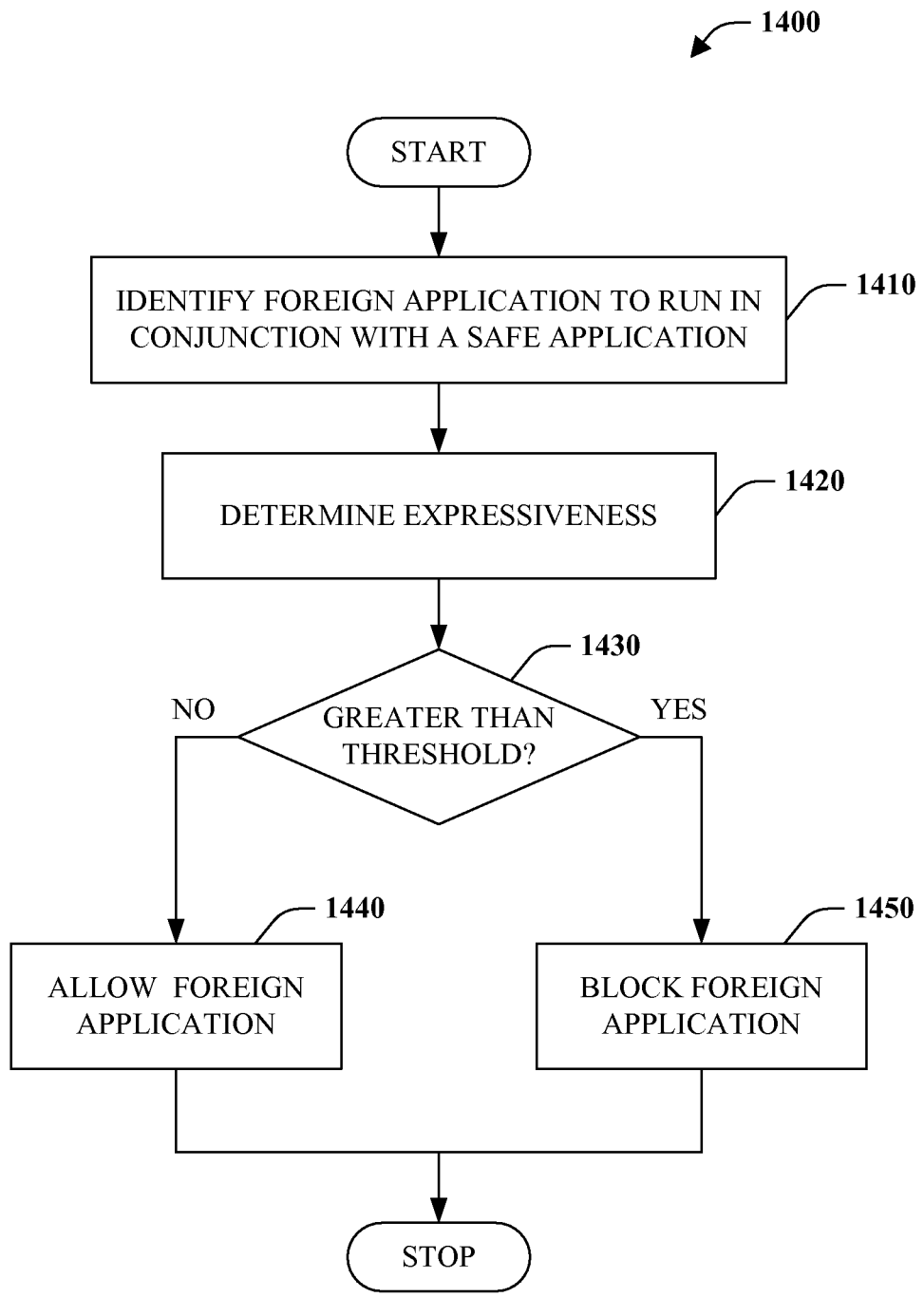
FIG. 14 is a flow chart diagram of a secure mashup method that blocks foreign applications in accordance with a disclosed aspect.

FIG. 14 illustrates a secure mashup method 1400 in accordance with an aspect of the claimed subject matter. At numeral 1410, a foreign application that is to be employed in conjunction with a native and/or safe application is identified. At reference numeral 1420, the application's expressiveness is determined. In other words, the application's functional abilities are determined. At reference 1430, a determination is made concerning whether the expressiveness is greater than a specified threshold. If the expressiveness is less than the threshold ("NO"), the application is allowed. If the expressiveness is greater than the threshold ("YES"), the foreign application is blocked and prevented from execution in combination with the safe application. This provides a means for filtering out applications that have the ability to circumvent security mechanisms provided with respect to the safe application.

Figure 15:
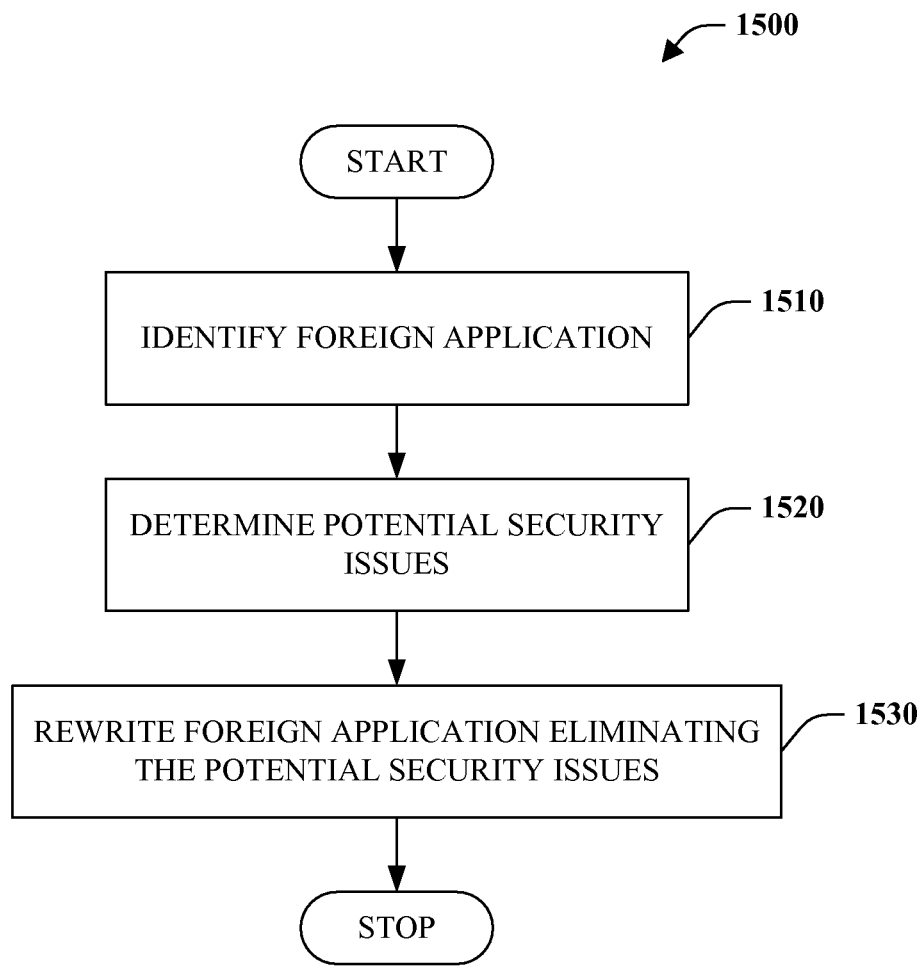
FIG. 15 is a flow chart diagram of a secure mashup method that rewrites a foreign application according to an aspect of the disclosure.

Referring to FIG. 15, a secure mashup method 1500 is shown in accordance with an aspect of the claimed subject matter. At reference numeral 1510, a foreign application is identified for mashing or combination with an application rendered safe by way of the aforementioned mechanisms. At numeral 1520, the application is analyzed to identify potential security issues. The foreign application is then transformed or rewritten in a manner that eliminates the potential security issues. This can be accomplished statically or dynamically at runtime. In one instance, this can be performed upon deployment on a server. Alternatively, the transformation can occur on a client side subsequent to safe application deployment. In this manner, the safe application can control deployment of the foreign/potentially unsafe application.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 16:
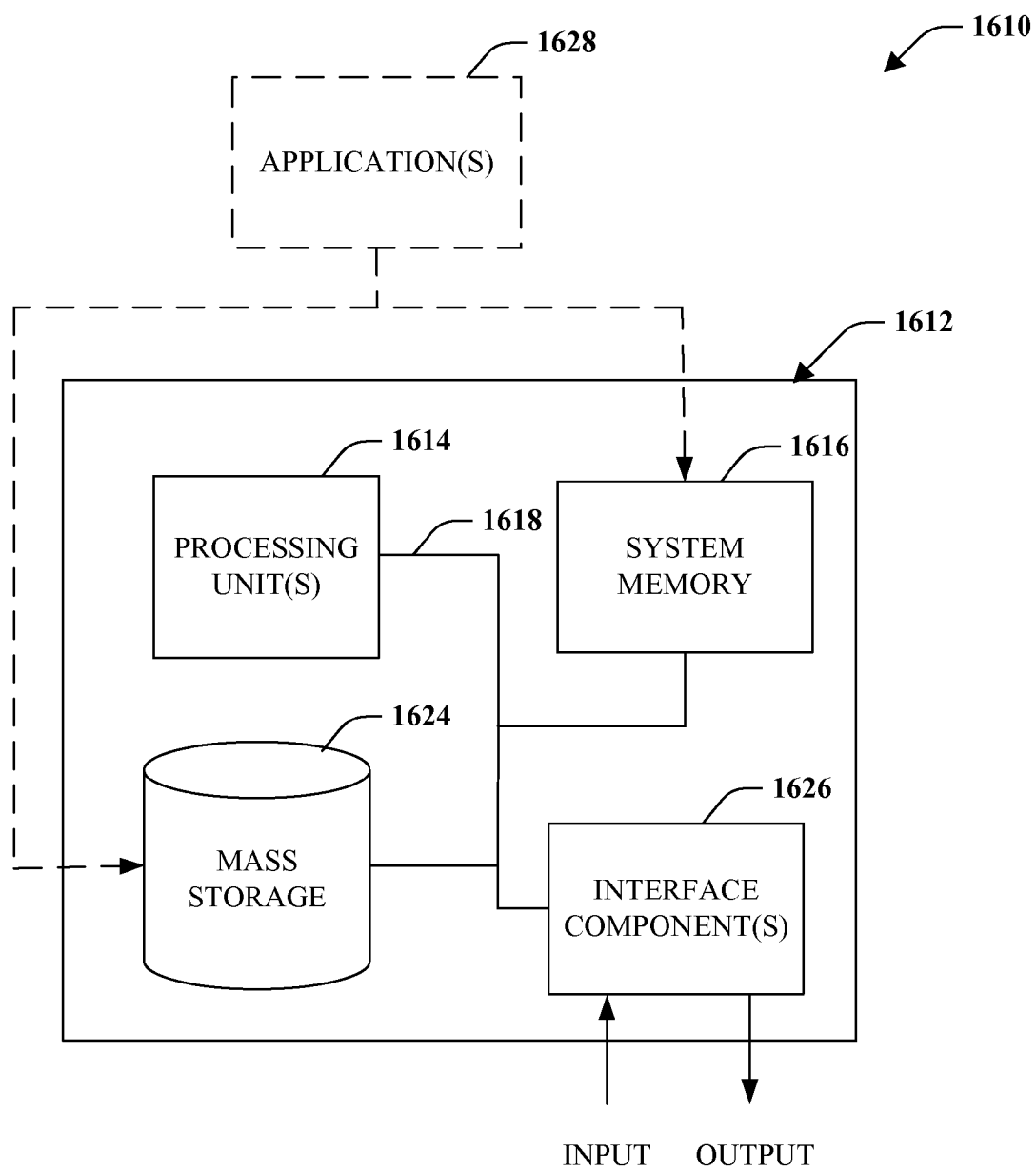
FIG. 16 is a schematic block diagram illustrating a suitable operating environment for aspects of the subject disclosure.
Figure 17:
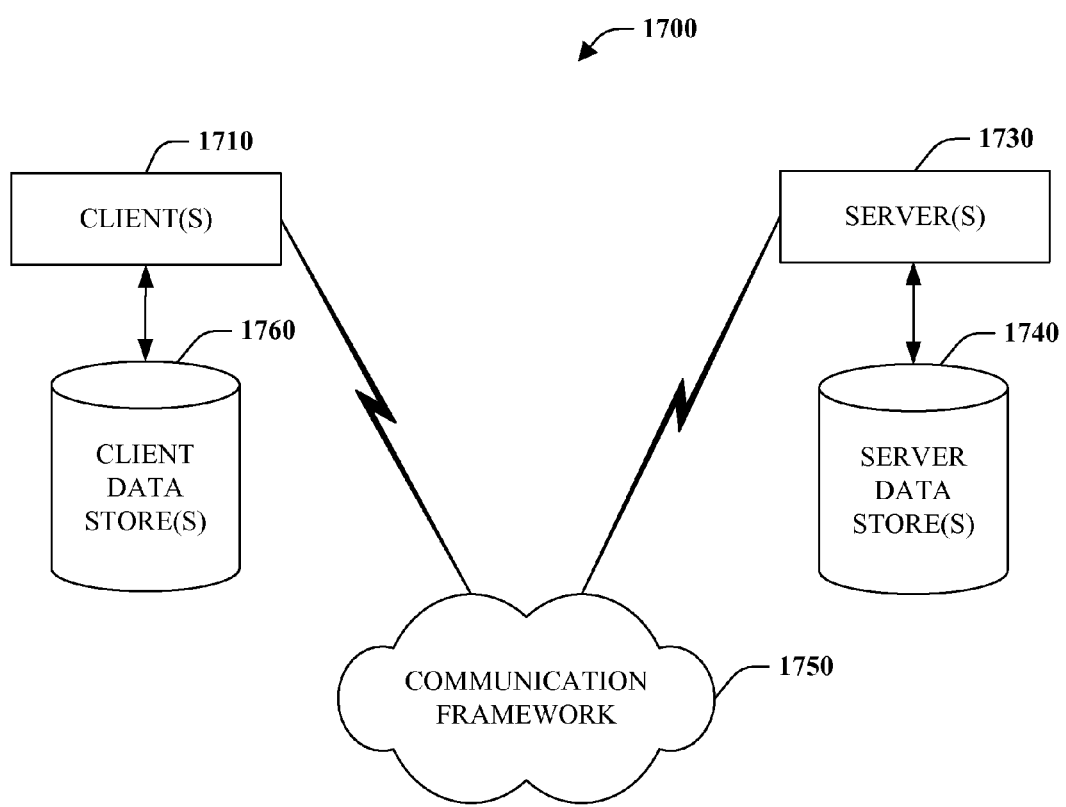
FIG. 17 is a schematic block diagram of a sample-computing environment.

In order to provide a context for the various aspects of the disclosed subject matter, FIGS. 16 and 17 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 16, an exemplary environment 1610 for implementing various aspects disclosed herein includes a computer 1612 (e.g., desktop, laptop, server, hand held, programmable consumer or industrial electronics . . . ). The computer 1612 includes a processing unit 1614, a system memory 1616, and a system bus 1618. The system bus 1618 couples system components including, but not limited to, the system memory 1616 to the processing unit 1614. The processing unit 1614 can be any of various available microprocessors. It is to be appreciated that dual microprocessors, multi-core and other multiprocessor architectures can be employed as the processing unit 1614.

The system memory 1616 includes volatile and nonvolatile memory. The basic input/output system (BIOS), containing the basic routines to transfer information between elements within the computer 1612, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1612 also includes removable/non-removable, volatile/non-volatile computer storage media. FIG. 16 illustrates, for example, mass storage 1624. Mass storage 1624 includes, but is not limited to, devices like a magnetic or optical disk drive, floppy disk drive, flash memory, or memory stick. In addition, mass storage 1624 can include storage media separately or in combination with other storage media.

FIG. 16 provides software application(s) 1628 that act as an intermediary between users and/or other computers and the basic computer resources described in suitable operating environment 1610. Such software application(s) 1628 include one or both of system and application software. System software can include an operating system, which can be stored on mass storage 1624, that acts to control and allocate resources of the computer system 1612. Application software takes advantage of the management of resources by system software through program modules and data stored on either or both of system memory 1616 and mass storage 1624.

The computer 1612 also includes one or more interface components 1626 that are communicatively coupled to the bus 1618 and facilitate interaction with the computer 1612. By way of example, the interface component 1626 can be a port (e.g., serial, parallel, PCMCIA, USB, FireWire . . . ) or an interface card (e.g., sound, video, network . . . ) or the like. The interface component 1626 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1612 to output device(s) via interface component 1626. Output devices can include displays (e.g., CRT, LCD, plasma . . . ), speakers, printers and other computers, among other things.

FIG. 17 is a schematic block diagram of a sample-computing environment 1700 with which the subject innovation can interact. The system 1700 includes one or more client(s) 1710. The client(s) 1710 can be hardware and/or software (e.g., threads, processes, computing devices). The system 1700 also includes one or more server(s) 1730. Thus, system 1700 can correspond to a two-tier client server model or a multi-tier model (e.g., client, middle tier server, data server), amongst other models. The server(s) 1730 can also be hardware and/or software (e.g., threads, processes, computing devices). The servers 1730 can house threads to perform transformations by employing the aspects of the subject innovation, for example. One possible communication between a client 1710 and a server 1730 may be in the form of a data packet transmitted between two or more computer processes.

The system 1700 includes a communication framework 1750 that can be employed to facilitate communications between the client(s) 1710 and the server(s) 1730. The client(s) 1710 are operatively connected to one or more client data store(s) 1760 that can be employed to store information local to the client(s) 1710. Similarly, the server(s) 1730 are operatively connected to one or more server data store(s) 1740 that can be employed to store information local to the servers 1730.

Client/server interactions can be utilized with respect with respect to various aspects of the claimed subject matter. In fact, a large portion of the disclosure concerns automatically securing distributed applications such as web applications. In one particular instance, capabilities as well as requests and responses thereto can be exchanged between client(s) 1710 and server(s) 1730 across communication framework 1750.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A distributed application development system, comprising:
    a processor coupled to a memory, the processor configured to execute the following computer-executable components stored in the memory:
    a first component configured to automatically construct a distributed application from a single tier application; and
    a second component configured to inject a first security component into the distributed application automatically during construction, the first security component is configured to control interaction based on transmission and validation of a secret identifier between a client and server indicative of one or more permissible client capabilities with respect to a server.

2. The system of claim 1, the first security component is configured to acquire the identifier from the server and transmit a client request with the identifier to the server.

3. The system of claim 2, the first security component is configured to transmit a copy of the identifier integrated with the client request.

4. The system of claim 1, the second component is configured to inject a second security component configured to encrypt communication between the client and the server.

5. The system of claim 1, the second component is configured to inject a second security component configured to monitor client and server communication and revoke a client capability upon detection of at least a potential malicious activity.

6. The system of claim 1, the second component is configured to inject a second security component configured to apply an encoding technique to serialize code as data.

7. The system of claim 6, the second security component is configured to apply an encoding technique as directed by a code annotation.

8. The system of claim 1, the second component is configured to inject a second security component configured to prevent combination of a second application with the distributed application, if functional ability of the second application is greater than a threshold.

9. The system of claim 1, the second component is configured to inject a second security component configured to rewrite a second application to remove potentially malicious functionality from a second application to be combined with the distributed application.

10. The system of claim 1, the identifier is provisioned and valid on a per transaction basis.

11. The system of claim 1, the identifier is transmitted in a cookie and as part of a request for service.

12. The system of claim 1, the identifier indicates one permissible client capability of a predetermined, ordered sequence of permissible client capabilities enforced by the server.

13. A method of distributed program development employing at least one processor configured to execute computer-executable instructions of a compiler stored in a memory to perform the following acts:
    splitting a single tier application into a distributed application; and
    injecting a first security component into the distributed application automatically, the security component is configured to control interaction between a client and a server as a function of exchange and validation of a secret key between the client and the server indicative of at least one permissible client capability to perform an action on the server.

14. The method of claim 13 further comprising injecting a second security component configured to initiate secure communication between the client and the server.

15. The method of claim 13 further comprising injecting a second security component configured to monitor client and server communication and revoke a capability upon detection of at least a potentially malicious activity.

16. The method of claim 13 further comprising injecting a second security component configured to prevent output of code.

17. The method of claim 13 further comprising injecting a second security component configured to ensure output is valid with respect to an output format specification.

18. A computer-readable storage device having instructions stored thereon that enable at least one processor to perform a method upon execution of the instructions, the method comprising:
   generating a multi-tier distributed application automatically at compile time from a single tier application; and
   injecting security code into the distributed application automatically at compile time, the security code is configured to control interaction between a client and server as a function of exchange and validation of a per transaction secret key, provided to the client by the server, indicative of a permissible action the server will perform upon request from the client.

19. The computer-readable storage device of claim 18, the method further comprises injecting security code configured to initiate secure communication between the client and the server.

20. The computer-readable storage device of claim 18, the method further comprises injecting security code configured to block script injection in presentation code.

* * * * *